United States Patent
Hartmann et al.

(10) Patent No.: US 9,511,744 B2
(45) Date of Patent: Dec. 6, 2016

(54) REMOTE CONTROL DEVICE FOR A MOTOR VEHICLE, AND METHOD FOR OPERATING SUCH A REMOTE CONTROL DEVICE

(71) Applicant: AUDI AG, Ingolstadt (DE)

(72) Inventors: Juergen Hartmann, Gutenstetten (DE); Patrick Sassmannshausen, Hettenshausen (DE); Andreas Stueber, Hofstetten (DE)

(73) Assignee: AUDI AG, Ingolstadt (DE)

( * ) Notice: Subject to any disclaimer, the term of this patent is extended or adjusted under 35 U.S.C. 154(b) by 48 days.

(21) Appl. No.: 14/404,198

(22) PCT Filed: Apr. 26, 2013

(86) PCT No.: PCT/EP2013/001260
§ 371 (c)(1),
(2) Date: Nov. 26, 2014

(87) PCT Pub. No.: WO2013/178314
PCT Pub. Date: Dec. 5, 2013

(65) Prior Publication Data
US 2015/0158460 A1   Jun. 11, 2015

(30) Foreign Application Priority Data
May 26, 2012 (DE) .......... 10 2012 010 564

(51) Int. Cl.
*B60R 25/24*    (2013.01)
*G07C 9/00*     (2006.01)

(52) U.S. Cl.
CPC .......... *B60R 25/24* (2013.01); *G07C 9/00174* (2013.01); *G07C 9/00944* (2013.01); *G07C 2009/00261* (2013.01)

(58) Field of Classification Search
None
See application file for complete search history.

(56) References Cited

U.S. PATENT DOCUMENTS

| 4,977,404 A | 12/1990 | Durst et al. |
| 5,541,571 A * | 7/1996 | Ochs .............. B60R 25/24 307/10.1 |

(Continued)

FOREIGN PATENT DOCUMENTS

| CN | 101423049 | 5/2009 |
| DE | 2805896 | 8/1979 |

(Continued)

OTHER PUBLICATIONS

Chinese Office Action dated Dec. 2, 2015 in corresponding Chinese Patent Application No. 201380027672.5.

(Continued)

*Primary Examiner* — Redhwan K Mawari
*Assistant Examiner* — Edward Torchinsky
(74) *Attorney, Agent, or Firm* — Staas & Halsey LLP

(57) ABSTRACT

A remote control device for a motor vehicle has a transmitting unit to transmit at least one signal, for remote control of at least one component of the motor vehicle. A switch effects transmission of the signal by operating the switch. A position detection device is provided, by which an actual position of the remote control device relative to a specifiable reference position can be detected. The signal is transmitted on the basis of the detected actual position. A method operates such a remote control device.

8 Claims, 1 Drawing Sheet

(56) References Cited

U.S. PATENT DOCUMENTS 6,518,882 B2    2/2003   Johnson et al.
7,183,897 B2 *   2/2007   Tang .................. G07C 9/00944
                                                                       340/426.36

FOREIGN PATENT DOCUMENTS

| DE | 3840643 | 6/1990 |
|---|---|---|
| DE | 4402853 | 11/1994 |
| DE | 19855605 | 6/2000 |
| DE | 102004043012 | 3/2006 |
| DE | 60022187 | 6/2006 |
| DE | 102009052079 | 5/2011 |
| DE | 202011003145 | 8/2011 |
| EP | 0502234 A1 | 9/1992 |
| EP | 1933282 | 6/2008 |
| WO | 01/57345 | 8/2001 |

OTHER PUBLICATIONS

German Office Action for German Priority Application No. 10 2012 010 564.9, issued Jan. 31, 2013, 5 pages.
English Language International Search Report for PCT/EP2013/001260, mailed Aug. 22, 2013.
WIPO English Language Translation of International Preliminary Report on Patentability for PCT/EP2013/001260, downloaded from WIPO website Nov. 26, 2014, 5 pages.
PCT/EP2013/001260, Apr. 26, 2013, Juergen Hartmann et al., AUDI AG.
DE 102012010564.9, May 26, 2012, Juergen Hartmann et al., AUDI AG.

* cited by examiner

REMOTE CONTROL DEVICE FOR A MOTOR VEHICLE, AND METHOD FOR OPERATING SUCH A REMOTE CONTROL DEVICE

CROSS REFERENCE TO RELATED APPLICATIONS

This application is based on and hereby claims priority to International Application No. PCT/EP2013/001260 filed on Apr. 26, 2013 and German Application No. 10 2012 010 564.9 filed on May 26, 2012, the contents of which are hereby incorporated by reference.

BACKGROUND

The invention relates to a remote control device for a motor vehicle and to a method for operating such a remote control device.

Such a remote control device and such a method for operating a remote control device can be gathered as known from WO 01/57345 A1. The remote control device is referred to as a remote control unit there and makes it possible to remotely control components in the form of movable parts of a motor vehicle. These movable parts are side windows of the motor vehicle in the present case.

In order to remotely control the movable parts, the remote control device comprises a transmitting device which is referred to as a transmitter unit and is intended to emit at least one signal which is used to remotely control the components. The remote control device also comprises at least one switch, by which the signal can be emitted by actuating the switch. In other words, if the switch is actuated, that is to say closed in the present case, the signal is emitted.

DE 10 2004 043 012 A1 also discloses a method and a device for preventing incorrect activation of at least one function of a motor vehicle using predetermined radio pulses, in which case activation is prevented if a key, which is simultaneously a transmitter of the predetermined radio pulses, is less than a predetermined distance away from a lock associated with the key.

Furthermore, DE 44 02 853 C1 and DE 20 2011 033 145 U1 disclose handheld transmitters for remote control, the handheld transmitter being able to emit a code for the remotely controlled actuation of at least one locking system of a motor vehicle. The handheld transmitter also comprises a standard key and a housing to which the standard key is movably connected relative to the housing. The standard key is used to mechanically actuate the locking system and an ignition lock of the motor vehicle. The handheld transmitter also has a sensor system for detecting the position of the standard key, in which case the code for the remotely controlled actuation of at least the locking system is emitted from the handheld transmitter on the basis of the position of the standard key or movement of the standard key from one position to another, as determined by the sensor system.

A portable motor vehicle localization system comprising a first transmitter/receiver on a portable device can be gathered as known from DE 600 22 187 T2. The device has an identification code which is recognized by a second transmitter/receiver in a motor vehicle. The device is used to transmit a signal to the second transmitter/receiver which is situated in the motor vehicle and operates in such a manner that, if said portable device is moved through an angular range, the peak value of the signal received by the second transmitter/receiver is detected while it is moved through said range. In this case, provision is made for said portable device to operate in such a manner that, if the device is moved back through said angular range and if the peak value is detected again, a signal is triggered in order to indicate, to the portable device, the direction of the motor vehicle relative to the device.

Furthermore, EP 1 933 282 A1 discloses a key having a key bit and a housing on which the key bit is pivotably held relative to the housing. The key bit is connected to an actuation element which can be pivoted concomitantly with the key bit. Two switches are also arranged on the housing and can be selectively actuated using the actuation element depending on the direction of rotation of the key when the key bit is inserted into a corresponding lock.

If the key is inserted, with its key bit, into the corresponding lock and is rotated in a first direction of rotation via the housing, the key bit and, together with the latter, the actuation element are pivoted relative to the housing, with the result that a first of the switches is actuated. If the key bit is rotated in an opposite direction of rotation via the housing, the key bit and, together with the latter, the actuation element are accordingly pivoted relative to the housing, with the result that the second switch is actuated.

Furthermore, DE 38 40 643 A1 discloses a remote control transmitter, the transmitter housing of which contains transmitter elements for emitting control commands selected on an input device of the transmitter using transmission signals formed in a signal converter of the transmitter. In this case, provision is made for the input device to be a position difference switch arrangement which is coupled to the transmitter housing and, in the event of an angular position deviation of the transmitter housing from a particular instantaneous reference position of the transmitter housing beyond a particular angle value, generates an output signal, which indicates the direction of the angular position deviation, as a control command which can be supplied to the signal converter.

DE 198 55 605 A1 discloses a handheld transmitter for remotely controlling operating functions, in particular motor vehicle functions, having a control device for controlling the emission of at least two different control signals for remotely controlling the operating functions. In this case, provision is made for there to be an internal sensor which detects a physical variable and the sensor state of which is changed on the basis of the detected variable and which is connected to the control device. The control device is designed in such a manner that it stipulates the control signal to be emitted on the basis of the sensor state.

Furthermore, a handheld transmitter for garage door devices or the like which are remotely actuated by wirelessly transmitted signals, having a signal generation device, an energy source and a manually actuatable transmission switch, in particular in the form of a pushbutton, installed in the transmitter housing, can be gathered as known from DE 28 05 896 A1. In this case, provision is made for a switch which is position-dependent in terms of the gravitational force to be arranged in a stationary connection with respect to the housing.

Finally, DE 10 2009 052 079 A1 discloses a portable remote control device for a vehicle. The remote control device comprises an acceleration sensor for detecting a movement of the remote control device and for outputting corresponding acceleration data. A conversion device for converting the acceleration data into a movement curve and/or rotation of the device is also provided. The remote control device also comprises an evaluation device for analyzing the movement curve and/or rotation in order to derive a control command therefrom. Finally, a switching device is provided and is designed to stipulate the start and/or the end of the detection of a movement of the remote control device in response to actuation by a user.

It has been shown that prevention of undesirable remote control of the at least one component of the motor vehicle is worthy of improvement since this prevention of the control of the component has hitherto been implemented only in such a manner that the actuation convenience of the remote control device is impaired.

SUMMARY

Therefore, one possible object is to further develop a remote control device for a motor vehicle and a method for operating such a remote control device of the type mentioned at the outset in such a manner that a particularly high level of actuation convenience of the remote control device is enabled while simultaneously reliably preventing undesirable remote control of the at least one component of the motor vehicle.

The inventors propose a remote control device for a motor vehicle, having a transmitting device. The transmitting device can be used to emit at least one signal for remotely controlling at least one component of the motor vehicle. The remote control device also comprises at least one switch, by which the emission of the signal by the transmitting device can be effected. For this purpose, the switch can be at least indirectly actuated manually by a person, for example.

A position detection device of the remote control device is provided. The position detection device can be used to detect an actual position of the remote control device relative to a predefinable reference position of the remote control device, in which case the signal can be emitted using the transmitting device on the basis of the detected actual position when actuating the switch. As a result, a function of the component which can be effected or caused by the emission of the signal can be effected on the basis of the detected actual position when actuating the switch.

The remote control device can be operated in at least two different operating modes on the basis of the detected actual position. At least one signal for remotely controlling a component of the motor vehicle can be preferably respectively emitted in each of the operating modes. The proposed remote control device can therefore be used in both operating modes to remotely control, that is to say drive, a corresponding component of the motor vehicle, with the result that at least one function of the corresponding component can be started or ended. This provides a very high level of availability of the functionality of the remote control device, which is associated with a very high level of actuation convenience. At the same time, incorrect triggering, that is to say incorrect control, can be reliably prevented.

The proposed operating modes differ from one another in terms of the manner in which the switch can be actuated in order to effect the emission of the signal and/or a corresponding function of the component. In other words, the switch can be actuated in a different manner in the first operating mode than in the second operating mode in order to effect the emission of the signal or a respective signal associated with the respective operating mode and/or the function of the component. This makes it possible, in particular, to reliably avoid undesirable remote control of the component on account of undesirable actuation of the switch.

On the one hand, undesirable remote control of the component can be reliably prevented in the remote control device since, with a corresponding actual position of the remote control device, the signal is not transmitted, for example, or is transmitted only if at least one further prerequisite is met, for example, or since, although the signal is emitted with a corresponding actual position, the function of the component is not effected or is effected only if at least one further prerequisite is met. In other words, it is possible, for example, to adjust or modify a response of the remote control device and/or of the component to actuation of the switch with a corresponding actual position.

On the other hand, this results in a very high level of actuation convenience of the remote control device since a person using the remote control device only has to change the actual position of the remote control device in a simple manner in order to effect a corresponding behavior or a corresponding response to the actuation of the switch. Furthermore, a very high level of availability of the function of the remote control device and/or of the component can therefore be demonstrated.

The proposed remote control device preferably enables wireless, that is to say contactless, remote control of the component. In this respect, the signal is, for example, electromagnetic waves, in particular radio waves or infrared rays. In particular, the emission of electromagnetic waves, in particular radio waves, enables wireless remote control of the component from a relatively great distance between the remote control device and the motor vehicle which is in the form of an automobile, for example.

In one advantageous embodiment, the operating modes differ from one another in terms of the signal to be emitted using the transmitting device. This means that a first signal is or can be emitted in the first operating mode and a second signal is or can be emitted in the second operating mode, in which case the signals are different from one another. In this case, the signals are different from one another in terms of their type, for example. Alternatively or additionally, the signals may be different from one another in terms of their content, that is to say in terms of their data or messages to the component of the motor vehicle, with the result that different functions or responses of the component as a result of the emission of the corresponding signal can be effected thereby, for example. This results in a very high level of functionality of the remote control device.

It has been shown to also be advantageous if the operating modes differ from one another in terms of the remotely controllable component of the motor vehicle. This means, for example, that a first component of the motor vehicle can be remotely controlled in the first operating mode, while a second component of the motor vehicle, which is different from the first component, can be remotely controlled using the remote control device in the second operating mode. This also comes in useful for a very high level of functionality of the connection device.

Furthermore, in order to achieve a very high level of actuation convenience as a result of a very wide range of functions, provision may be made for the operating modes to differ from one another in terms of a respective function to be carried out by the component as a result of the remote control, even though the same component of the motor vehicle can be controlled in both operating modes.

In order to clearly distinguish and delimit the manners in which the switch can be actuated in the individual operating modes, provision is made, for example, for the manner to be an actuation period of the switch, in which case the switch can be actuated for a shorter actuation period in the first operating mode than in the second operating mode. Alternatively or additionally, it is possible for the manner in which the switch can be actuated in order to effect the emission and/or the function of the component, that is to say to cause the component to carry out its function, to be an actuation frequency of the switch, in which case the switch can be actuated less often in the first operating mode than in the second operating mode in order to effect the respective emission and/or the function.

The switch which can be actuated, for example, using a pushbutton or another actuation element of the remote control device can therefore be actuated more frequently in the second operating mode than in the first operating mode, preferably over a predefinable period, in order to effect the emission and/or the function.

If the remote control device is in a trouser pocket belonging to the driver of the motor vehicle, for example, and is therefore in a very oblique actual position in comparison with the horizontal, the remote control device can be actuated in the second operating mode, for example. The switch can then be actuated more frequently and/or for a longer period than in the first operating mode in order to cause the component to carry out its function on account of the emission of the signal.

The component is, for example, a locking system for locking doors and/or tailgates of the motor vehicle. If the signal is emitted, the locking system is locked or unlocked.

If the locking system is locked, the remote control device can be operated in its second operating mode, and if the remote control device is in the trouser pocket, only single and/or very short actuation of the switch does not result in the locking system being unlocked, with the result that incorrect unlocking is avoided. The switch must then be pushed for a longer period, for example two seconds and/or repeatedly within two seconds, for example twice, in order to unlock the locking system.

If the remote control device is in the driver's hand and is in a less oblique actual position in comparison with the horizontal, the remote control device can be operated in the first operating mode, with the result that the switch must be actuated, in particular pushed, less often and/or for a shorter period than in the second operating mode in order to unlock the locking system.

However, it is also possible to unlock the locking system when the remote control device is in the driver's hand but the driver is holding the remote control device in a very oblique manner, with the result that it can be operated in the second operating mode. Nevertheless, in this case, the function of unlocking the locking system is available to the driver. For this purpose, it is only necessary for the driver to actuate the switch, in particular the pushbutton, for longer and/or more frequently than in the first operating mode.

For this purpose, it is only necessary for the driver to actuate the switch, in particular the button, for longer and/or more frequently than in the first operating mode. The function of actuating the locking system is therefore provided and is available to the driver in both operating modes, which results in a very high level of actuation convenience.

The second aspect relates to a method for operating a remote control device for a motor vehicle, in particular an automobile, in which at least one signal is emitted using a transmitting device of the remote control device in order to remotely control at least one component of the motor vehicle, the emission of the signal being effected by actuating at least one switch of the remote control device.

Provision is made for an actual position of the remote control device relative to a reference position to be detected using a position detection device of the remote control device, the signal being emitted using the transmitting device on the basis of the detected actual position when actuating the switch. In this case, the remote control device is operated in at least two different operating modes on the basis of the detected actual position. The operating modes differ from one another in terms of the manner in which the switch can be actuated in order to effect the emission of the signal or a function of the component on account of the emission. Advantageous refinements of the first aspect can be considered to be advantageous refinements of the second aspect and vice versa. On the one hand, the proposed method makes it possible to reliably prevent undesirable incorrect control of the component. On the other hand, the method enables a very high level of control convenience of the remote control device since the signal is emitted on the basis of the detected actual position and the actual position can be changed in a simple and convenient manner by a user of the remote control device.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
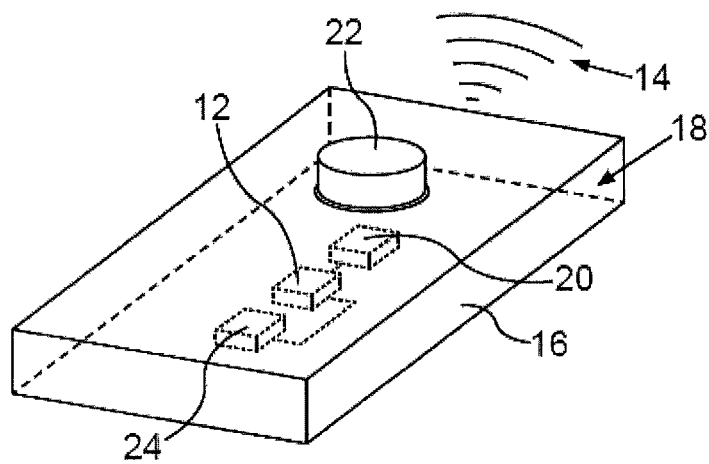
FIG. 1 shows a schematic perspective view of a remote control device for a motor vehicle, which device comprises a transmitting device for emitting signals, in which case the signals can be emitted on the basis of an actual position relative to a reference position of the remote control device.

Reference will now be made in detail to the preferred embodiments of the present invention, examples of which are illustrated in the accompanying drawings, wherein like reference numerals refer to like elements throughout.

FIG. 1 shows a remote control device 10 for a motor vehicle. The remote control device 10 is, for example, a remote control key, in particular a radio key, of the motor vehicle, which can be used to remotely control a component in the form of a locking system of the motor vehicle. For this purpose, the remote control device 10 comprises a transmitting device 12 which can be used to emit schematically illustrated signals 14. The signals 14 are, for example, electromagnetic waves, in particular radio waves, which can be received by a receiving device of the motor vehicle. As a result, the locking system which is coupled to the receiving device can be wirelessly unlocked and locked owing to the reception of the signals 14, with the result that doors and/or tailgates of the motor vehicle can be opened or are protected against opening.

In this case, the transmitting device 12 is arranged on a housing 16 of the remote control device 10, the housing 16 bounding a receiving space 18. The transmitting device 12 is accommodated in the receiving space 18.

The remote control device 10 also comprises a switch 20 which is accommodated in the receiving space 18 and can be actuated using an actuation element, in the form of a pushbutton 22 in the present case. The emission of the signals 14 can be effected using the switch 20 by actuating the switch 20 using the pushbutton 22. For this purpose, the pushbutton 22 is actuated, that is to say pushed, as a result of which the switch 20 is closed. If the pushing of the pushbutton 22 is ended, the pushbutton moves back into a starting position, for example with the application of a spring force using at least one spring element, with the result that the switch 20 is opened and the actuation of the switch 20 is ended.

The remote control device 10 also comprises a position detection device 24 which is accommodated in the receiving space 18 and can be used to detect an actual position of the remote control device relative to a predefinable reference position, for example relative to the horizontal. In this case, the signals 14 can be emitted on the basis of the detected actual position. In the present case, this means that at least one item of information, that is to say data, characterizing the actual position is transmitted to the receiving device by the signals 14. As a result, the receiving device is informed of the actual position of the remote control device, with the result that the function of the locking system, that is to say the locking or unlocking, is consequently effected and carried out on the basis of the actual position.

Figure 2:
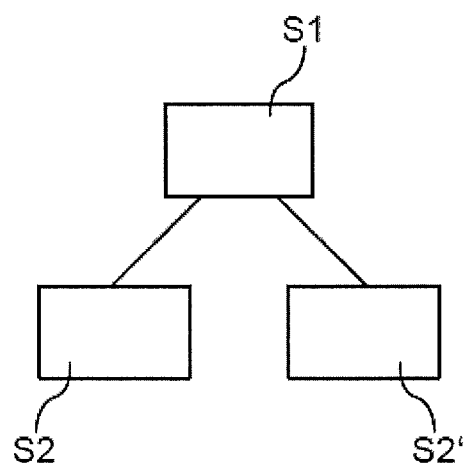
FIG. 2 shows a basic illustration for illustrating a method for operating the remote control device according to FIG. 1.

FIG. 2 is used to depict the emission of the signals 14 when predefinable criteria are satisfied. In S1 of a method for operating the remote control device 10, the actual position is detected using the position detection device 24, in which case an inclination of the remote control device 10 relative to the horizontal is detected. If the actual position of the remote control device 10, that is to say its inclination with respect to the horizontal, is in a first angular range, the remote control device 10 is operated in a first operating mode in S2.

If the actual position, that is to say the inclination, is in a second angular range different from the first angular range, the remote control device 10 is operated in a second operating mode different from the first operating mode in S2' following the S1. In other words, the remote control device 10 is operated in one of the operating modes depending on the angular range in which the remote control device 10 is held or oriented relative to the horizontal, that is to say how obliquely the remote control device 10 is held or oriented relative to the horizontal. The number of operating modes and therefore the number of angular ranges different from one another may also be higher, that is to say may be at least three. In each of the operating modes, another function of the locking system or another component of the motor vehicle can be caused by actuating the pushbutton 22 and/or other control logic of the pushbutton 22 can be provided.

In the present case, the operating modes differ in terms of the control logic of the pushbutton 22. In other words, the operating modes differ in the manner in which the switch 20 can be actuated using the pushbutton 22 in order to effect the function of the locking system, that is to say to unlock and lock the latter.

If the remote control device 10, which is a key of the motor vehicle for example, is held at least substantially in a horizontal manner or in a very small angular range around the horizontal, the first operating mode is set. In the first operating mode, a short push of the pushbutton 22 and therefore brief, single closing of the switch 20 suffices to unlock or lock the locking system. With such pushing of the pushbutton 22, the signals 14 and, by the latter, the information relating to the actual position are transmitted to the receiving device. The latter detects or determines that the remote control device 10 should be operated in the first operating mode in which single pushing of the pushbutton 22 suffices to actuate the locking system.

In contrast, if the remote control device 10 is held in a more oblique manner, the second operating mode is set. In the second operating mode, the switch 20 must be closed for a longer period than in the first operating mode and/or must be closed more frequently than in the first operating mode, for example twice, within a predefinable period using the pushbutton 22 in order to thereby unlock or lock the locking system. This period is two seconds, for example.

With corresponding pushing of the pushbutton 22 twice and/or for a long time, the signals 14 and, by the latter, the information relating to the actual position are transmitted to the receiving device. The latter detects or determines that the remote control device 10 should be operated in the second operating mode in which pushing of the pushbutton 22 twice and/or for a longer time suffices to actuate the locking system.

If the remote control device 10 is held obliquely in this manner, with the result that it is operated in the second operating mode, and if the pushbutton 22 is then pushed only once within two seconds, the signals 14 are transmitted to the receiving device. However, the receiving device detects that the remote control device 10 should be operated in the second operating mode in which such pushing of the pushbutton 22 (actuation of the switch 20) does not suffice to actuate the locking system.

This control logic in the second operating mode, which is changed in comparison with the first operating mode, makes it possible to avoid unintentional actuation of the locking system. Incorrect control is thus avoided if the remote control device 10 is in a trouser pocket, for example.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide* v. *DIRECTV*, 69 USPQ2d 1865 (Fed. Cir. 2004).

The invention claimed is:

1. A remote control device for a motor vehicle, comprising:
    a transmitting device to emit a signal to remotely control the motor vehicle and thereby activate a selected function of a selected component of the motor vehicle;
    a switch to receive a required user input and to cause emission of the signal when the required user input is received at the switch; and
    a position detection device to detect an actual position of the remote control device relative to a predefinable reference position, the actual position determining in which of at least two modes the remote control device will operate, the modes differing from one another in terms of the selected component.

2. The remote control device as claimed in claim 1, wherein
    the actual position of the remote control device is relative to a horizontally oriented position of the remote control device, and
    the modes differ from one another such that:
        in a first actual position, a first component of the motor vehicle is controlled, and
        in a second actual position, a second component of the motor vehicle is controlled.

3. A remote control device for a motor vehicle, comprising:

a transmitting device to emit a signal to remotely control the motor vehicle and thereby activate a selected function of a selected component of the motor vehicle;

a switch to receive a required user input and to cause emission of the signal when the required user input is received at the switch; and a position detection device to detect an actual position of the remote control device relative to a predefinable reference position, the actual position determining in which of at least two modes the remote control device will operate, the modes differing from one another in terms of the required user input, wherein the remote control device has first and second modes which differ from one another in terms of at least one of:

in the first mode, a user is required to actuate the switch for a shorter actuation time and in the second mode, the user is required to actuate the switch for a longer actuation time, in the first mode, the user is required to actuate the switch a plurality of times in succession and in the second mode, the user is required to actuate the switch less than the plurality of times, and in the first mode, the user is required to actuate the switch at a first actuation frequency and in the second mode, the user is required to actuate the switch at a second actuation frequency, the second actuation frequency being higher than the first actuation frequency such that both the first and second modes require the user to actuate the switch a plurality of times.

4. The remote control device as claimed in claim 1, wherein the remote control device operates in at least three modes, in a first mode, unlocked doors of the motor vehicle are locked when the signal is emitted, in both a second mode and a third mode, locked doors of the motor vehicle are unlocked when the signal is emitted, in the second mode, the remote control device is in an actual position relatively close to a horizontally oriented position of the remote control device, in the third mode, the remote control device is in an actual position relatively far from the horizontally oriented position of the remote control device, and the third mode requires the user to actuate the remote control device longer or for more times than the second mode.

5. A method for operating a remote control device for a motor vehicle, comprising:

emitting a signal using a transmitting device of the remote control device in order to remotely control the motor vehicle and activate a selected function of a selected component of the motor vehicle;

receiving a required user input at a switch of the remote control device and causing emission of the signal when the switch receives the required user input; and detecting an actual position of the remote control device relative to a reference position using a position detection device of the remote control device, the actual position determining in which of at least two different modes the remote control device will operate, the modes differing from one another in terms of the selected component.

6. The method as claimed in claim 5, wherein the actual position of the remote control device is relative to a horizontally oriented position of the remote control device, and the modes differ from one another such that:

in a first actual position, a first component of the motor vehicle is controlled, and in a second actual position, a second component of the motor vehicle is controlled.

7. A method for operating a remote control device for a motor vehicle, comprising:

emitting a signal using a transmitting device of the remote control device in order to remotely control the motor vehicle and activate a selected function of a selected component of the motor vehicle;

receiving a required user input at a switch of the remote control device and causing emission of the signal when the switch receives the required user input; and detecting an actual position of the remote control device relative to a reference position using a position detection device of the remote control device, the actual position determining in which of at least two different modes the remote control device will operate, the modes differing from one another in terms of the required user input, wherein the remote control device has first and second modes which differ from one another in terms of at least one of:

in the first mode, a user is required to actuate the switch for a shorter actuation time and in the second mode, the user is required to actuate the switch for a longer actuation time, in the first mode, the user is required to actuate the switch a plurality of times in succession and in the second mode, the user is required to actuate the switch less than the plurality of times, and in the first mode, the user is required to actuate the switch at a first actuation frequency and in the second mode, the user is required to actuate the switch at a second actuation frequency, the second actuation frequency being higher than the first actuation frequency such that both the first and second modes require the user to actuate the switch a plurality of times.

8. The method as claimed in claim 5, wherein the remote control device operates in at least three modes, in a first mode, unlocked doors of the motor vehicle are locked when the signal is emitted, in both a second mode and a third mode, locked doors of the motor vehicle are unlocked when the signal is emitted, in the second mode, the remote control device is in an actual position relatively close to a horizontally oriented position of the remote control device, in the third mode, the remote control device is in an actual position relatively far from the horizontally oriented position of the remote control device, and the third mode requires the user to actuate the remote control device longer or for more times than the second mode.

* * * * *